US012542136B2

(12) United States Patent
Carbune et al.

(10) Patent No.: US 12,542,136 B2
(45) Date of Patent: Feb. 3, 2026

(54) DYNAMICALLY CONFIGURING A WARM WORD BUTTON WITH ASSISTANT COMMANDS

(71) Applicant: GOOGLE LLC, Mountain View, CA (US)

(72) Inventors: Victor Carbune, Zurich (CH); Antonio Gaetani, Kilchberg (CH); Bastiaan Van Eeckhoudt, Thalwil (CH); Daniel Valcarce, Zurich (CH); Michael Golikov, Merlischachen (CH); Justin Lu, Zurich (CH); Ondrej Skopek, Zurich (CH); Nicolo D'Ercole, Oberrieden (CH); Zaheed Sabur, Zurich (CH); Behshad Behzadi, Freienbach (CH); Luv Kothari, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 253 days.

(21) Appl. No.: 17/532,315

(22) Filed: Nov. 22, 2021

(65) Prior Publication Data
US 2023/0061929 A1 Mar. 2, 2023

Related U.S. Application Data

(60) Provisional application No. 63/236,862, filed on Aug. 25, 2021.

(51) Int. Cl.
*G10L 17/22* (2013.01)
*G10L 17/00* (2013.01)
(52) U.S. Cl.
CPC .................................. *G10L 17/22* (2013.01)

(58) Field of Classification Search
CPC .......... G06F 3/017; G10L 17/00; G10L 17/22
(Continued)

(56) References Cited

U.S. PATENT DOCUMENTS 4,631,364 A * 12/1986 Coyne .................. H04M 9/003
379/915
7,920,678 B2 4/2011 Cooper et al.
(Continued)

FOREIGN PATENT DOCUMENTS

WO 2019234392 12/2019
WO WO-2022192468 A1 * 9/2022 .......... G06F 3/04817

*Primary Examiner* — Richemond Dorvil
*Assistant Examiner* — Rodrigo A Chavez
(74) *Attorney, Agent, or Firm* — Gray Ice Higdon

(57) ABSTRACT

Implementations described herein relate to configuring a dynamic warm word button, that is associated with a client device, with particular assistant commands based on detected occurrences of warm word activation events at the client device. In response to detecting an occurrence of a given warm word activation event at the client device, implementations can determine whether user verification is required for a user that actuated the warm word button. Further, in response to determining that the user verification is required for the user that actuated the warm word button, the user verification can be performed. Moreover, in response to determining that the user that actuated the warm word button has been verified, implementations can cause an automated assistant to perform the particular assistant command associated with the warm word activation event. Audio-based and/or non-audio-based techniques can be utilized to perform the user verification.

14 Claims, 5 Drawing Sheets

(58) Field of Classification Search
USPC .......................................................... 704/275
See application file for complete search history.

(56) References Cited

U.S. PATENT DOCUMENTS

| | | | |
|---|---|---|---|
| 8,230,021 B2* | 7/2012 | Sumner | G06Q 10/107 |
| | | | 455/414.1 |
| 9,299,350 B1 | 3/2016 | Dumont et al. | |
| 9,635,164 B2 | 4/2017 | Smith et al. | |
| 10,466,963 B2 | 11/2019 | Levi et al. | |
| 10,591,904 B1* | 3/2020 | Gagliano | G05B 19/4185 |
| 10,802,848 B2 | 10/2020 | Liu et al. | |
| 11,024,304 B1 | 6/2021 | Smith | |
| 11,275,553 B2 | 3/2022 | Amarilio et al. | |
| 11,801,748 B2* | 10/2023 | Ide | B60W 30/18109 |
| 2011/0105854 A1* | 5/2011 | Kiani | G16Z 99/00 |
| | | | 600/300 |
| 2011/0167375 A1* | 7/2011 | Kocienda | G06F 3/04886 |
| | | | 715/773 |
| 2012/0265528 A1 | 10/2012 | Gruber et al. | |
| 2013/0314383 A1* | 11/2013 | Jung | H04N 21/4438 |
| | | | 345/184 |
| 2014/0052681 A1 | 2/2014 | Nitz et al. | |
| 2014/0082706 A1* | 3/2014 | Banford | H04L 63/08 |
| | | | 726/5 |
| 2015/0019342 A1 | 1/2015 | Gupta | |
| 2015/0254057 A1* | 9/2015 | Klein | H04N 21/4668 |
| | | | 704/275 |
| 2015/0312398 A1 | 10/2015 | Li | |
| 2016/0034249 A1 | 2/2016 | Lee et al. | |
| 2016/0179332 A1* | 6/2016 | Cho | G06F 3/0483 |
| | | | 715/863 |
| 2017/0075539 A1* | 3/2017 | Borromeo | G06F 3/04812 |
| 2017/0329464 A1* | 11/2017 | Hong | G06F 3/04817 |
| 2018/0061403 A1 | 3/2018 | Devaraj et al. | |
| 2018/0113672 A1 | 4/2018 | Klein et al. | |
| 2018/0210700 A1 | 7/2018 | Roman et al. | |
| 2018/0211024 A1* | 7/2018 | Zhao | G06F 21/32 |
| 2018/0233147 A1 | 8/2018 | Tukka et al. | |
| 2018/0314536 A1* | 11/2018 | Wang | G06Q 20/326 |
| 2018/0341344 A1* | 11/2018 | Foss | G06Q 20/085 |
| 2018/0342243 A1 | 11/2018 | VanBlon et al. | |
| 2019/0020761 A1 | 1/2019 | Golden et al. | |
| 2019/0139542 A1 | 5/2019 | Gunther | |
| 2019/0333522 A1* | 10/2019 | Lesso | G10L 17/06 |
| 2019/0348040 A1 | 11/2019 | Mann et al. | |
| 2019/0361694 A1* | 11/2019 | Gordon | G06F 9/452 |
| 2020/0120094 A1* | 4/2020 | Jain | H04L 63/107 |
| 2020/0285319 A1* | 9/2020 | Sirpal | H04N 21/4312 |
| 2020/0374257 A1* | 11/2020 | Shepherd | H04L 51/224 |
| 2021/0076169 A1* | 3/2021 | Arachchi | H04W 4/021 |

* cited by examiner

DYNAMICALLY CONFIGURING A WARM WORD BUTTON WITH ASSISTANT COMMANDS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) directed to an automated assistant, which may in some cases be converted into text and then processed, and/or by providing textual (e.g., typed) natural language input directed to an automated assistant. These spoken utterances and/or typed inputs often include assistant commands directed to an automated assistant. An automated assistant generally responds to these assistant commands by providing responsive user interface output(s) (e.g., audible and/or visual user interface output), controlling smart device(s), and/or performing other action(s).

Automated assistants typically rely upon a pipeline of components in interpreting and responding to these spoken utterances and/or typed inputs. For example, an automatic speech recognition (ASR) engine can process audio data that correspond to a spoken utterance of a user to generate ASR output, such as a transcription (i.e., sequence of term(s) and/or other token(s)) of the spoken utterance. Further, a natural language understanding (NLU) engine can process the ASR output (or typed inputs) to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain responsive content to the spoken utterance.

In some cases, this pipeline of components can be bypassed. For example, some client devices may include buttons (e.g., hardware buttons and/or software buttons) that are mapped directly to fulfillment output in certain scenarios (also referred to as "warm word buttons"). For instance, if an alarm is sounding at a client device, then a warm word button of the client device may be configured with an assistant command to silence the alarm or snooze the alarm when actuated by a user. Also, for instance, if an incoming telephone call is received at a client device of a user, then a warm word button of the client device may be configured with an assistant command to send the telephone call to voicemail when actuated by a user.

However, in many of these cases, the assistant commands with which these warm word buttons of a client device may be configured are limited for various reasons (e.g., data security of a user of the client device). For instance, if an incoming text message is received at a client device, then a warm word button of the client device may not be configured to view the incoming text message and/or initiate a reply message to the incoming message to ensure a user that is not associated with the client device views the incoming text message or initiates a reply to the incoming text message. As a result, users may be required to interact with client devices in other manners, thereby increasing a quantity of user inputs received at the client devices and wasting computational resources.

SUMMARY

Implementations disclosed herein are directed to dynamically configuring a warm word button, that is associated with a client device, with a variety of contextually relevant assistant commands based on warm word activation events that are detected in an environment of the client device. The warm word button can be, for example, a hardware button of the client device, an external button (e.g., hardware and/or software) that is associated with the client device, and/or an agnostic software button of the client device that may be omnipresent at a display of the client device and configured with various functionalities (e.g., various default functionalities (e.g., a lock button, a power button, an automated assistant button, etc.), various assistant commands, etc.). Further, implementations disclosed herein are additionally or alternatively directed to causing user verification of a user that actuated the warm word button to be performed. The user verification can include, for example, audio-based user verification techniques (e.g., text independent (TI) speaker identification (SID), text dependent (TD) SID, etc.), non-audio-based verification techniques (e.g., face identification (FID), fingerprint identification, password identification, etc.), and/or other user verification techniques.

For example, assume that a text message is received at a client device and that the incoming text message corresponds to a warm word activation event. Further assume that, based on detecting the occurrence of the warm word activation event (e.g., the incoming text message being received at the client device), an automated assistant configures a warm word button with a "reply" assistant command that, when actuated, causes the automated assistant to execute an assistant command of initiating a reply to the incoming text message by dictating a reply text message to the incoming text message. Further assume that a user actuates the warm word button. In this example, the automated assistant may determine that user verification of the user that actuated the warm word button is required to cause performance of the "reply" assistant command. Accordingly, the automated assistant can cause the user verification to be performed prior to allowing the user to dictate the reply text message. In this example, the automated assistant can utilize audio-based verification techniques to verify the identity of the user that actuated the warm word button based on the nature of the assistant command (e.g., an intent of replying to the incoming text message being mapped to requiring audio-based verification) and/or based on the user providing spoken utterance(s) to craft the reply text message.

As another example, assume that a music is being streamed at a client device and that the streaming of the music corresponds to a warm word activation event. Further assume that, based on detecting the occurrence of the warm word activation event (e.g., the music being streamed at the client device), an automated assistant configures a warm word button with a "pause" assistant command that, when actuated, causes the automated assistant to execute an assistant command of pausing the music being streamed at the client device. Further assume that a user actuates the warm word button. In this example, and in contrast with the above example, the automated assistant may determine that user verification of the user that actuated the warm word button is not required to cause performance of the "pause" assistant command and/or that a non-audio-based user verification is required. Accordingly, the automated assistant can optionally cause the user verification to be performed prior to allowing the user to pause the music. In this example, the automated assistant can optionally utilize non-audio-based verification techniques to verify the identity of the user that actuated the warm word button based on the nature of the assistant command (e.g., an intent of pausing the music being mapped to requiring no verification or non-audio-based verification).

The warm word activation event can include, for example, a phone call being received at a client device, a text message being received at a client device, an email being received at a client device, an alarm or timer sounding at a client device, media being played at a client device or an additional client device in an environment of the client device, a notification being received at a client device, a location of a client device, a software application being accessed at a client device, and/or other events associated with a client device in which the user can provide a spoken utterance to cause the client device, or an additional client device in communication with the client device, to be controlled. Notably, the warm word button can be configured with different assistant commands for varying durations of time based on a type of the warm word activation event. For example, assume that a phone call is being received at the client device and that the incoming phone call corresponds to a warm word activation event. In this example, the warm word button can be configured with an assistant command associated with the incoming phone call for a duration of time corresponding to the phone ringing and deactivated after the phone stops ringing (e.g., reverting back to some default functionality). As another example, assume that a text message is received at the client device and that the incoming text message corresponds to a warm word activation event. In this example, the warm word button can be configured with an assistant command associated with the incoming text message event for a predefined duration of time after the text message is initially received (e.g., for 15 seconds, for 30 seconds, for 10 minutes, etc.).

In some implementations, the automated assistant can configure the warm word button with a default assistant command associated with the warm word activation event. For example, a "reply" assistant command may be a default assistant command when the detected warm word activation event corresponds to an incoming text message, a "view" assistant command may be a default assistant command when the detected warm word activation event corresponds to an incoming notification, a "screen call" assistant command may be a default assistant command when the detected warm word activation event corresponds to an incoming phone call, a "stop" assistant command may be a default assistant command when the detected warm word activation event corresponds to an sounding timer or alarm, and so on. In additional or alternative implementations, the automated assistant can configure the warm word button with a user-defined assistant command associated with the warm word activation event that is specified by the user of the client device. For example, the user may access settings of an automated assistant application accessible at the client device to define, for one or more of the warm word activation events, an assistant command that the automated assistant should utilize to configure the warm word button with when occurrences of the warm word activation events are detected.

In some implementations, in determining whether to cause user verification of the user that actuated the warm word button to be performed and/or what type of user verification to be performed, the automated assistant can consider a type of warm word activation event. For example, the warm word activation events that are associated with incoming communications directed to a user of the client device (e.g., incoming phone call, incoming text message, incoming email, etc.) may require audio-based verification of the user that actuated the warm word button, whereas other warm word activation events (e.g., sounding alarms or timers, streaming media, etc.) may require non-audio-based verification of the user that actuated the warm word button or no user verification. In additional or alternative implementations, in determining whether to cause user verification of the user that actuated the warm word button to be performed and/or what type of user verification to be performed, the automated assistant can consider, the automated assistant can consider an intent or group of intents associated with the assistant command utilized to configure the warm word button. For example, assume that the warm word activation events corresponds to a phone call being received at the client device, and the assistant commands associated with the phone call being received at the client device include an "answer" assistant command that causes the automated assistant to answer the phone call, a "decline" assistant command that causes the automated assistant to decline the phone call, and a "screen call" assistant command that causes the automated assistant to screen the phone call prior to the user joining the phone call. In this example, if the warm word button is configured with the "answer" command, then audio-based user verification may be required prior to the automated assistant causing the phone call to be answered. However, the "decline" and "screen call" assistant commands may only require non-audio-based user verification or no user verification.

In some implementations, the automated assistant may utilize user verification of the user that actuated the warm word button that was previously performed without causing the user verification to be performed subsequent to the actuation of the warm word button. For example, assume that a text message is received at a client device and that the incoming text message corresponds to a warm word activation event. Further assume that, based on detecting the occurrence of the warm word activation event (e.g., the incoming text message being received at the client device), an automated assistant configures a warm word button with a "reply" assistant command that, when actuated, causes the automated assistant to execute an assistant command of initiating a reply to the incoming text message by dictating a reply text message to the incoming text message. Further assume that a user actuates the warm word button. However, assume that some form of user verification (e.g., audio-based verification and/or non-audio-based verification) was performed within a threshold duration of time prior to receiving the incoming electronic communication (e.g., three seconds, five seconds, etc.). In this example, the prior user verification may suffice to enable the user to actuate the warm word button and cause the automated assistant to perform the assistant command without requiring any additional user verification to be performed.

In some implementations, in performing audio-based verification, the automated assistant can process, using SID model(s), a stream of audio data that captures voice activity of a user to generate a speaker embedding for the user that provided the spoken utterance. The voice activity can be captured at the same time as actuation of the warm word button or within a threshold duration of time of actuation of the warm word button (e.g., a few seconds before actuation of the warm word button and/or a few seconds after actuation of the warm word button). The generated speaker embedding can be compared, in embedding space, with one or more previously generated speaker embeddings for the user of the client device=(e.g., an embedding associated with a user profile of the user). For example, if a distance metric, determined based on the comparing in the embedding space, between the generated speaker embedding and the one or more previously generated speaker embeddings for the user satisfies a threshold, the user can be verified. The one or more previously generated speaker embeddings for the user can be generated based on output(s) generated based on processing of one or more instances of audio data that includes spoken utterances that are from the user (e.g., when initially configuring the client device). For example, the one or more previously generated speaker embeddings can be based on an average (or other combination) of a plurality of different embeddings that are each generated based on processing of a corresponding instance of audio data that includes a corresponding spoken utterance from the user of the client device. In some versions of those implementations, the SID model can be a text independent (TI) SID model, whereas in additional or alternative implementations, the SID model can be a text dependent (TD) SID model.

In TD SID, the one or more previously generated speaker embeddings of the user are generated based on spoken utterances that include only one or more particular words or phrases. Moreover, in use, the user must speak the one or more particular words or phrases for one or more TD SID speaker embedding to be generated using the TD SID model, which can be effectively compared to one or more previously generated TD speaker embedding for the user to determine whether the spoken utterance is from an authorized user (e.g., the user of the client device or another user associated with the client device). For example, the one or more particular words or phrases in TD speaker recognition can be constrained to one or more invocation phrases configured to invoke the automated assistant (e.g., hot words and/or trigger words such as, for example, "Hey Assistant", "OK Assistant", and/or "Assistant") or one or more other words or phrases. In contrast, in TI SID, the spoken utterance processed using the TI SID model is not constrained to the one or more particular words or phrases. In other words, audio data based on virtually any spoken utterances can be processed using the TI SID model to generate a TI SID speaker embedding, which can be effectively compared to one or more previously generated TI speaker embeddings for the user to determine whether the spoken utterance is from an authorized user (e.g., the user of the client device or another user associated with the client device). Moreover, in various implementations, the one or more previously generated TI speaker embeddings of the user utilized in TI SID are generated based on spoken utterances that include disparate words and/or phrases and are not limited to invocation words and/or phrases, and/or any other particular spoken utterances.

In some implementations, in performing non-audio-based verification, the automated assistant can process biometric information and/or other information to verify the identity of the user that actuated the warm word button. The biometric information utilized to verify the identity of the user can include, for example, facial identification, fingerprint identification, and/or other types of biometric information. For example, vision components of the client device can capture vision data that includes a face of the user that provided the spoken utterance. The automated assistant can process, using a face identification (FID) model, the vision data to generate a facial embedding of the user that actuated the warm word button. The facial embedding of the user that actuated the warm word button can correspond to an embedding that can be compared, in embedding space, to one or more previously generated embeddings corresponding to a facial embedding of the user of the client device to determine whether the user is authorized to cause performance of the assistant command. As another example, a fingerprint sensor can receive touch input of the user that provided the spoken utterance, and compare the detected fingerprint with a known fingerprint of the user of the client device to determine whether the user is authorized to cause performance of the assistant command. As yet another example, a display interface of the client device can receive touch input of the user corresponding to a password of the client device to verify an identity of the user that actuated the warm word button.

Moreover, implementations described herein are additionally or alternatively directed to determining current state(s) of additional client device(s) co-located in an environment of the client device, and utilizing the current state(s) of the additional client device(s) in determining the assistant commands to configure the warm word button. The current state(s) of the additional client device(s) can be determined based on corresponding signal(s) detected at the client device. For instance, the current state(s) of the additional client device(s) can include, for example, an indication that media is being played at one or more of the additional client devices, an indication that an alarm or timer is sounding at one or more of the additional client devices, an indication that a smart networked appliance has a current state (e.g., a smart dishwasher finishing a cleaning cycle, a smart oven reaching a particular temperature, etc.), and/or any other current state of any other additional computing devices. In these implementations, the warm word button can be configured with assistant commands that cause the client device to be controlled and/or that cause the additional client device(s) to be controlled.

In some versions of those implementations, the automated assistant can configure the warm word button based on warm word activation events detected at the client device and based on the current state(s) of the additional client device(s). For example, assume the warm word activation event corresponds to a phone call being received at the client device. Further assume that a music is being played at a smart speaker co-located in an environment of the client device. In this example, the warm word button may be configured with an assistant command that, when actuated, causes the music being played at the smart speaker to be paused based on the current state of the smart speaker indicating that music is being played even though the assistant command that causes the music being played at the smart speaker to be paused is not directly related to the warm word activation event detected at the client device (e.g., the incoming phone call). Nonetheless, by configuring the warm word button to pause the music in this example, the user can quickly and efficiently cause the music to be paused such that, when the user subsequently causes the incoming phone call to be answered, the user does not have to speak over the music during the phone call.

In additional or alternative implementations, the automated assistant can configure the warm word button based on warm word activation events detected at the additional client device(s) and based on the current state(s) of the additional client device(s). For example, assume the warm word activation event corresponds to a movie being initiated at a smart TV that is co-located in an environment of the client device. In this example, the warm word button that is associated with the client device may be configured with an assistant command that, when actuated, causes smart light bulb(s) that are also co-located in the environment of the client device to be dimmed. Similar to the above example, the warm word button can be configured to control other devices even though the warm word activation event is based on signals generated by an additional client device (e.g., the smart TV) and the assistant command with which the warm word button that is associated with the client device is configured does not control the client device (e.g., controlling the smart light bulb(s) instead). Nonetheless, by configuring the warm word button to dim the smart light bulb(s) in this example, the user can quickly and efficiently cause the cause the smart light bulb(s) to be dimmed via reduced user input (e.g., a single tap of the warm word button rather than manually dimming the lights via a software application associated with the smart light bulb(s)).

In various implementations, the automated assistant may still detect an occurrence of the warm word activation event that was previously acted upon (e.g., after the automated assistant caused an assistant command to be performed with which the warm button was initially configured). For instance, and from the above examples, the system may still detect the incoming phone call at the client device after the warm word button was actuated to pause the music at the smart speaker, or the movie being initiated at the smart TV after the warm word button was actuated to dim the lights. In these examples, the automated assistant may reconfigure the warm word button with a successive assistant command that is associated with the warm word activation event. For instance, in the above example where the warm word activation event corresponds to the incoming phone call, assume the user actuated the button to pause the music being played by the smart speaker. In this example, the automated assistant can cause the warm word button to be reconfigured with an assistant command that, when actuated, causes an automated assistant to answer the incoming phone call. Notably, in this example, the current state of the smart speaker will indicate that the music that was playing at the smart speaker has already been paused, so the automated assistant may not consider reconfiguring the warm word button with the same assistant command that was previously acted upon. Also, for instance, in the above example where the warm word activation event corresponds to the movie being initiated at the smart TV, assume the user actuated the button to dim the smart light bulb(s). In this example, the automated assistant can cause the warm word button to be reconfigured with an assistant command that, when actuated, causes the client device to be placed in a "do not disturb mode" or a "silent" mode.

By using techniques described herein, one or more technical advantages can be achieved. As one non-limiting example, the techniques described herein enable the automated assistant to determine how to dynamically configure warm word button, that is associated with a client device, with a variety of contextually relevant assistant commands based on warm word activation events that are detected in an environment of the client device, and the user can actuate the warm word button to cause the automated assistant to initiate performance of the assistant commands. As a result, a quantity of user inputs can be reduced by enabling a single tap performance of these assistant commands, thereby conserving computational resources at the client device or additional client device(s) that process the user inputs. In implementations where the automated assistant causes the warm word button to be configured with successive assistant commands, the quantity of user inputs can even be further reduced. Further, the techniques described herein enable the automated assistant to verify an identity of a user audio-based techniques and/or non-audio-based techniques for certain assistant commands. As a result, only authorized users (e.g., one or more users that are, in fact, associated with the client device) can cause certain assistant commands to be performed, thereby increasing data security of data associated with a user of the client device.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
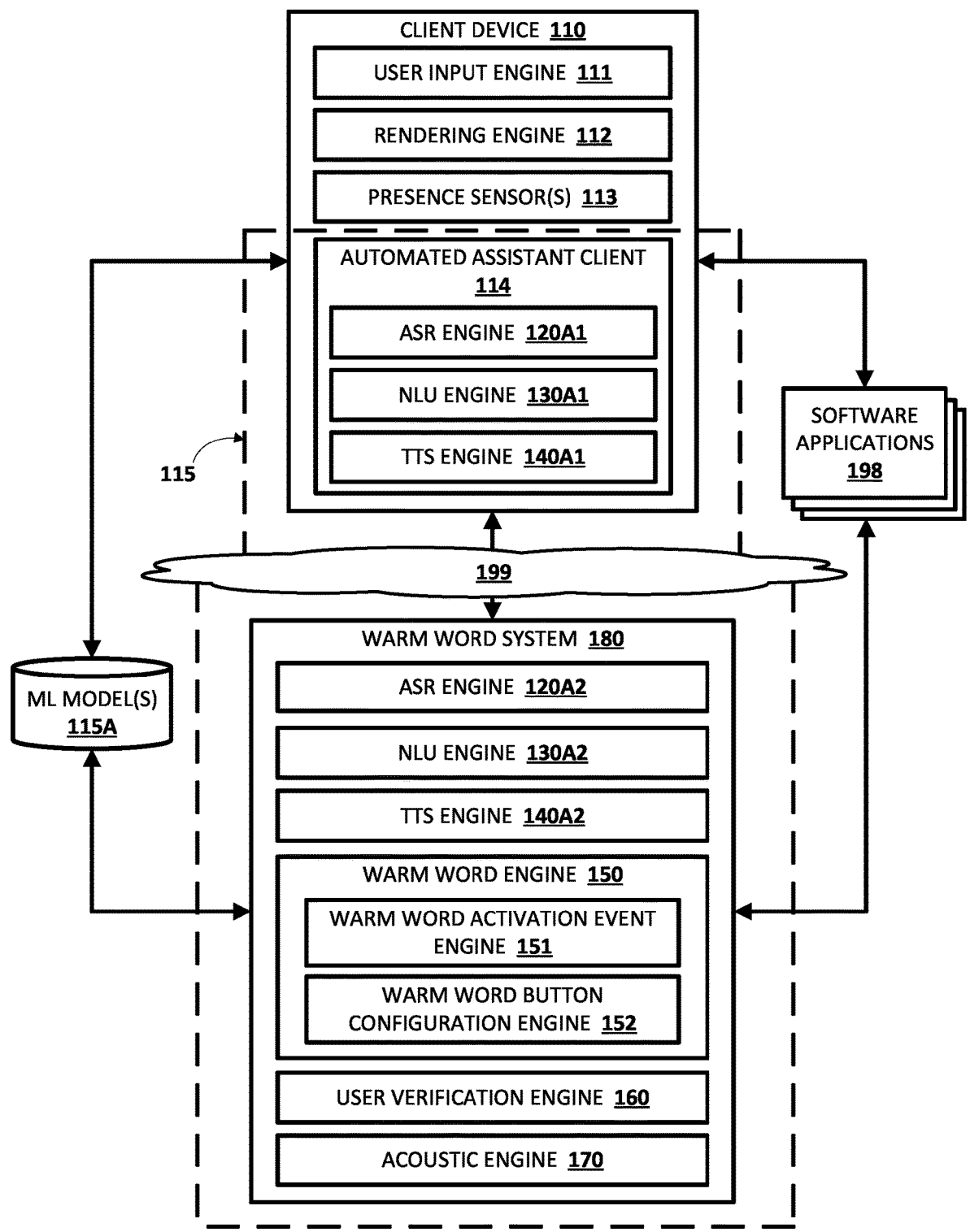
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a warm word system 180. In some implementations, the warm word system 180 can be implemented locally at the client device 110. In additional or alternative implementations, the warm word system 180 can be implemented remotely from the client device 110 as depicted in FIG. 1 (e.g., by remote server(s)). In these implementations, the client device 110 and the warm word system 180 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the warm word system 180 implemented locally at the client device 110 or via one or more of the networks 199 as depicted in FIG. 1. The automated assistant client 114 (and optionally by way of its interactions with other remote system (e.g., with remote server(s))) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the warm word system 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing on the client device 110 and/or interacting with one or more servers that may implement the warm word system 180.

In various implementations, the client device 110 may include a user input engine 111 that is configured to detect user input provided by a user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Additionally, or alternatively, the client device 110 may be equipped with access to one or more buttons, such as a hardware button of the client device 110, an external button (e.g., hardware and/or software) that is associated with the client device 110, and/or an agnostic software button of the client device 110 that may be omnipresent at a display of the client device 110 and configured with various functionalities (e.g., various default functionalities (e.g., a lock button, a power button, an automated assistant button, etc.), various assistant commands, etc.).

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110. Additionally, or alternatively, the client device 110 may be in communication with one or more external user interface output devices, such as an external display or projector, that enables content to be provided for visual presentation to the user via the client device 110 via the external user interface output devices.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering responsive content (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. As described herein, the automated assistant 115 can leverage data determined based on the presence sensors 113 in determining the client device 110 (or other computing device(s)) based on where a user is near or was recently near, and provide corresponding commands to only the client device 110 (or those other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice (e.g., described with respect to user verification engine 160). In some implementations, movement of the speaker may then be determined, e.g., by the presence sensors 113 of the client device 110 (and optionally GPS sensors, Soli chips, and/or accelerometers of the client device 110). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 115, especially if not much time has passed since the last engagement.

Further, the client device 110 and/or the warm word system 180 may include one or more memories for storage of data and/or software applications 198, one or more processors for accessing data and executing the software applications 198, and/or other components that facilitate communication over one or more of the networks 199. In some implementations, one or more of the software applications 198 can be installed locally at the client device 110, whereas in other implementations one or more of the software applications 198 can be hosted remotely (e.g., by remote server(s)) and can be accessible by the client device 110 over one or more of the networks 199. The operations performed by the client device 110, other client device(s) and/or computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., one or more of the networks 199 of FIG. 1).

In some implementations, the operations performed by the automated assistant 115 may be implemented locally at the client device 110 via the automated assistant client 114. As shown in FIG. 1, the automated assistant client 114 may include an automatic speech recognition (ASR) engine 120A1, a natural language understanding (NLU) engine 130A1, and a text-to-speech (TTS) engine 140A1. In some implementations, the operations performed by the automated assistant 115 may be distributed across multiple computer systems, such as when the warm word system 180 is implemented remotely from the client device 110 as depicted in FIG. 1. In these implementations, the automated assistant 115 may additionally or alternatively utilize ASR engine 120A2, NLU engine 130A2, and TTS engine 140A2 of the warm word system 180.

Each of these engines may be configured to perform one or more functions. For example, the ASR engine 120A1 and/or 120A2 can process, using ASR model(s) stored in machine learning (ML) model(s) database 115A (e.g., a recurrent neural network (RNN) model, a transformer model, and/or any other type of ML model capable of performing ASR), audio data that captures voice activity and/or spoken utterances and that is generated by microphone(s) of the client device 110 to generate ASR output. Further, the NLU engine 130A1 and/or 130A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output to generate NLU output. Moreover, the TTS engine 140A1 and/or 140A2 can process, using TTS model(s) stored in the ML model(s) database 115A, textual data (e.g., text formulated by the automated assistant 115) to generate synthesized speech audio data that includes computer-generated synthesized speech.

In various implementations, the ASR output can include, for example, one or more speech hypotheses (e.g., term hypotheses and/or transcription hypotheses) that are predicted to correspond to the voice activity and/or the spoken utterance of the user captured in the audio data, one or more corresponding predicted values (e.g., probabilities, log likelihoods, and/or other values) for each of the one or more speech hypotheses, a plurality of phonemes that are predicted to correspond to the voice activity and/or the spoken utterance of the user captured in the audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein in an environment of a user. These additional client devices and/or computing devices may be in communication with the client device 110 (e.g., over one or more of the networks 199). As another example, a given client device can be utilized by multiple users in a shared setting (e.g., a group of users of a household or other shared spaces).

As described herein, the automated assistant 115 can determine whether to cause an assistant command to be performed in response to detecting actuation of a warm word button that is associated with the client device 110 based on an identity of a speaker that actuated the warm word button and/or based on a current state of other client device(s) and/or computing device(s) in an environment of the user that actuated the warm word button. In making this determination, the automated assistant can utilize warm word engine 150, user verification engine 160, and/or acoustic engine 170. In various implementations, and as depicted in FIG. 1, the warm word engine 150 can include warm word activation event engine 151 and a warm word button configuration engine 152.

In some implementations, the warm word activation event engine 151 can monitor for an occurrence of a warm word activation event. The warm word activation event can include, for example, a phone call being received at the client device 110, a text message being received at the client device 110, an email being received at the client device 110, media being played at the client device 110 or an additional client device in an environment of the client device 110, a notification being received at the client device 110, a location of the client device 110 (e.g., the user at home, work, etc.), a time at the location of the client device 110, a software application, of the one or more software applications 198, being accessed at the client device 110, and/or other events associated with the client device 110 in which a warm word button can be configured with assistant commands.

In some versions of those implementations, and in response to detecting an occurrence of a warm word activation event, the warm word activation event engine 151 can cause the warm word button configuration engine 152 to configure a warm word button with a particular assistant command that is associated with the warm word activation event (e.g., the button described with respect to the user input engine 111). When actuated, the warm word button can cause the automated assistant 115 to perform the particular assistant command without explicitly invoking the automated assistant 115 via invocation words or phrases (e.g., "Assistant", "Hey Assistant", etc.), invocation gestures, or other means for invoking the automated assistant 115. Put another way, the warm word button can be mapped to a particular intent, particular fulfillment data, and/or a particular software application of the one or more software applications 198 that are accessible at the client device 110, such that the automated assistant 115 can bypass utilization of various assistant components (e.g., the ASR engines 120A1 and/or 120A2, the NLU engines 130A1 and/or 130A1, and/or other automated assistant components) to cause performance of particular the assistant command with which the warm word button is configured.

In some further versions of those implementations, the warm word button can remain active until one or more conditions are satisfied. The one or more conditions can include, for example, lapsing of a threshold duration of time, detecting one or more of the particular words or phrases, determining the warm word activation event has concluded, and/or other conditions described herein. For example, assume the warm word activation event includes an incoming text message being received at the client device 110. In this example, the warm word button can be configured with a "reply" warm word such that, when actuated, the user of the client device 110 can begin speaking a reply text message that is a reply to the incoming text message until the user initiates the reply to the incoming text message or until a threshold duration of time lapses (e.g., 10 seconds). As another example, assume the warm word activation event includes a phone call being received at the client device 110. In this example, the warm word button can be configured with an "answer" assistant command or a "screen call" assistant command such that, when actuated, the user of the client device 110 can cause the incoming phone call to be acted upon until the phone call stops ringing. Accordingly, it should be understood that, once activated, the warm word button described herein can be activated for static or dynamic durations of time based on the warm word activation event. In various implementations, when the one or more conditions are satisfied, the warm word button can revert back to a default functionality (e.g., a power button, a lock screen button, etc.).

In some implementations, one or more warm word activation events can be associated with multiple disparate assistant commands. For example, assume the warm word activation event includes a phone call being received at the client device 110. In this example, the incoming phone call can be associated with assistant commands of "answer" that causes the automated assistant to answer the incoming phone call, "screen call" that causes the automated assistant to screen the incoming phone call, "voicemail" that causes the automated assistant to send the incoming phone call to voicemail, "decline" that causes the automated assistant to decline the incoming phone call, and/or other assistant commands. As another example, assume the warm word activation event includes media being played at the client device 110 or an additional client device in an environment of the client device 110. In this example, the media being played can be associated with assistant commands of "volume up" that causes the automated assistant to increase a volume of the media being played, "volume down" that causes the automated assistant to decrease a volume of the media being played, "pause" that causes the automated assistant to pause the media being played, "resume" that causes the automated assistant to resume the media being played, and/or other assistant commands.

In some implementations, the warm word button configuration engine 152 can configure the warm word button with a warm word model activation command that is associated with the detected warm word activation event and that, when actuated, can cause one or more currently dormant automated assistant functions that utilize warm word model(s) stored in the ML model(s) database 115A to be activated (e.g., a low power digital signal processor (DSP), a central processing unit (CPU), etc.). The warm word model(s) can be trained to detect one or more particular words or phrases (also referred to herein as "warm words") that are each associated with an assistant command. The one or more particular words or phrases can be associated with the assistant command such that, when detected, the automated assistant 115 can cause a particular action to be performed without explicitly invoking the automated assistant 115 via invocation words or phrases (e.g., "Assistant", "Hey Assistant", etc.), invocation gestures, or other means for invoking the automated assistant 115. Put another way, the one or more particular words or phrases can be mapped to a particular intent, particular fulfillment data, and/or a particular software application of the one or more software applications 198 that are accessible at the client device 110, such that the automated assistant 115 can bypass utilization of various assistant components (e.g., the ASR engines 120A1 and/or 120A2, the NLU engines 130A1 and/or 130A1, and/or other automated assistant components) to cause performance of the assistant command that is associated with the one or more particular words or phrases.

In some versions of those implementations, one or more of the currently dormant automated assistant functions that utilize the warm word model(s) can remain active until one or more conditions are satisfied. The one or more conditions can include, for example, lapsing of a threshold duration of time, detecting one or more of the particular words or phrases, determining the warm word activation event has concluded, and/or other conditions described herein. For example, assume the warm word activation event includes a timer sounding at the client device 110. In this example, one or more of the currently dormant automated assistant functions that utilize the warm word model(s) can remain active after an actuation of the warm word button and until the user provides a warm word to stop the sounding of the timer, or until the user manually stops the timer, or until a threshold duration of time lapses (e.g., 10 seconds) even if the time is still sounding (e.g., timeout after 10 minutes). As another example, assume the warm word activation event includes a notification being received at the client device 110. In this example, one or more of the currently dormant automated assistant functions that utilize the warm word model(s) can remain active after an actuation of the warm word button and until the user provides a warm word to interact with the notification, until the user manually dismisses the notification, or until a threshold duration of time (e.g., 30 seconds, 60 seconds, etc.) lapses. As yet another example, assume the warm word activation event includes a phone call being received at the client device 110. In this example, one or more of the currently dormant automated assistant functions that utilize the warm word model(s) can remain active after an actuation of the warm word button and until the user provides a warm word to interact with the phone call or until the phone call stops ringing. Accordingly, it should be understood that, once activated after an actuation of the warm word button, one or more of the currently dormant automated assistant functions that utilize the warm word model(s) described herein can be activated for static or dynamic durations of time based on the warm word activation event detected and/or how the user of the client device 110 responds to the warm word activation event.

In some implementations, the warm word model(s) described herein can include a plurality of disparate warm word models (e.g., audio keyword classification model(s)) that are trained to detect one or more particular words or phrases (e.g., warm words) that, when detected, cause the automated assistant 115 to perform an assistant command that is associated with one or more of the particular words or phrases. In some implementations, a given warm word model can be trained to detect a particular subset of words or phrases that are associated with a given warm word activation event. For example, assume that music is playing at the client device 110 or another client device in communication with the client device 110. In this example, a given warm word model can be trained to detect a subset of particular words or phrases that cause assistant commands associated with controlling the music to be performed, such as a "pause" warm word that may cause the music to be paused, a "resume" warm word that may cause the music to be resumed after being paused, a "volume up" warm word that may cause a volume of the music to be turned up, a "volume down" warm word that may cause a volume of the music to be turned down, a "next" warm word that may cause the music to skip to a next song, and so on for other particular words or phrases associated with the music. Accordingly, in this example, one or more of the currently dormant assistant functions that utilize the given warm word model can be activated in response to an actuation of the warm word button and in response to determining that the music is playing at the client device 110 or another client device in communication with the client device 110. Thus, at a single instance of time, one or multiple warm word models may be active at the client device 110.

In additional or alternative implementations, multiple warm word models can be trained to detect the subset of words or phrases that are associated with a given warm word activation event. Continuing with the above example, a first warm word model can be trained to detect one or more first particular words or phrases, such as the "pause" warm word and the "resume" warm word, a second warm word model can be trained to detect one or more second particular words or phrases, such as the "volume up" warm word and the "volume down" warm word, a third warm word model can be trained to detect one or more third particular words or phrases, such as the "next" warm word, and so on for other particular words or phrases associated with the music. Accordingly, in this example, one or more of the currently dormant assistant functions that utilize at least the first warm word model, the second warm word model, and the third warm word model can be activated in response to an actuation of the warm word button and in response to determining that the music is playing at the client device 110 or another client device in communication with the client device 110.

In various implementations, the warm word model(s) described herein can be trained based on a plurality of training instances. Each of the plurality of training instances can include training instance input and training instance output. The training instance input can include audio data, where a portion of the audio data corresponds to one or more of the particular words or phrases that a given warm word model is being trained to detect, and the training instance output can include ground truth output, where the ground truth output includes an indication of whether the audio data of the training instance input includes one or more of the particular words or phrases that the given warm word model is being trained to detect. For example, in training the given warm word model in the above example described with respect to the music playing, training instance input, for a given training instance, can include audio data that corresponds to "turn the volume up", and training instance output, for the given training instance, can include ground truth output that indicates the audio data includes one or more of the particular words or phrases (e.g., "volume up"). The training instance input can be applied as input to the given warm word model to generate predicted output (e.g., a value, such as a probability, log likelihood, binary value, or other values) that is indicative of a likelihood of whether the training instance input includes one or more of the particular words or phrases. The predicted output can be compared to the ground truth output (e.g., a value that indicates the audio data of the training instance input does, in fact, include one or more of the particular words or phrases, such as a value of "1" in this example) of the training instance input to generate one or more losses, and the given warm word model can be updated based on one or more of the losses. In this example, the given training instance can be considered a positive training instance because the training instance input includes the portion of the audio data that the given warm word model is being trained to detect. Further, in this example, the given warm word model can optionally be additionally trained based on negative training instances, or training instances having training instance input corresponding to audio data that does not include one or more of the particular words or phrases that the given warm word model is being trained to detect.

For example, in training the given warm word model in the above example described with respect to the music playing, training instance input, for a given training instance, can include audio data that corresponds to "turn on the lights", and training instance output, for the given training instance, can include ground truth output that indicates the audio data includes does not include one or more of the particular words or phrases (e.g., "volume up"). The training instance input can be applied as input to the given warm word model to generate predicted output (e.g., a value, such as a probability, log likelihood, binary value, or other values) that is indicative of a likelihood of whether the training instance input includes one or more of the particular words or phrases. The predicted output can be compared to the ground truth output (e.g., a value that indicates the audio data of the training instance input does, in fact, include one or more of the particular words or phrases, such as a value of "0" in this example) of the training instance input to generate one or more losses, and the given warm word model can be updated based on one or more of the losses. In this example, the given training instance can be considered a negative training instance because the training instance input does not include any portion of the audio data that the given warm word model is being trained to detect (e.g., "volume up" or any other audio corresponding to controlling the music).

In some implementations, and assuming one or more of the automated assistant functions that utilize warm word model(s) are active, the automated assistant 115 can process a stream of audio data generated by microphone(s) of the client device using the warm word model(s) to monitor for an occurrence of one or more particular words or phrases after an actuation of the warm word button. For example, assume a text message is received at the client device 110. Further assume the warm word activation event engine 151 detects the text message being received at the client device 110, and the warm word button configuration engine 152 configures the warm word button with a warm word model activation command, and activates one or more automated assistant components that utilize one or more warm word models for detecting particular words or phrases in response to actuation of the warm word button. In this example, further assume that a user provides a spoken utterance of "reply that I'll be there in five minutes" after actuating the warm word button. Accordingly, in processing the stream of audio data, the automated assistant 115 can detect that a portion of the audio data corresponds to an occurrence of the warm word "reply", and incorporate recognized text corresponding to "I'll be there in five minutes" into a reply text message that is responsive to the received text message.

In some implementations, the warm word button configuration engine 152 can configure the warm word button with a default assistant command that is associated with the detected warm word activation event as a particular assistant command. Continuing with the above example, in response to the warm word activation event engine 151 detecting an incoming phone call at the client device 110, the warm word button configuration engine 152 can select, for example, a "screen call" assistant command as a default assistant command associated with the incoming phone call, and configure the warm word button to screen the incoming telephone call when actuated. Also continuing with the above example, in response to the warm word activation event engine 151 detecting media being played at the client device 110 or an additional client device in an environment of the client device 110, the warm word button configuration engine 152 can select, for example, a "pause" assistant command as a default assistant command associated with the media being played, and configure the warm word button to pause the media being played when actuated.

In additional or alternative implementations, the warm word button configuration engine 152 can configure the warm word button with a particular assistant command that is associated with the detected warm word activation event and that is specified by the user. For example, the user can specify (e.g., via an automated assistant application accessible at the client device 110) particular assistant commands to be utilized in configuring the warm word button for particular warm word activation events. Continuing with the above example, in response to the warm word activation event engine 151 detecting an incoming phone call at the client device 110, the warm word button configuration engine 152 can select, for example, a "screen call" assistant command as the particular assistant command associated with the incoming phone call based on the user previously indicating the warm word button should be configured with the "screen call" assistant command in response to receiving the incoming phone call. Also continuing with the above example, in response to the warm word activation event engine 151 detecting media being played at the client device 110 or an additional client device in an environment of the client device 110, the warm word button configuration engine 152 can select, for example, a "pause" assistant command as the particular assistant command associated with the media being played based on the user previously indicating the warm word button should be configured with the "pause" assistant command when the media is being played.

In some implementations, the warm word button configuration engine 152 can configure the warm word button with a warm word user interface command that is associated with the detected warm word activation event and that, when actuated, can cause a warm word user interface to be provided for visual presentation to the user. For example, in response to detecting an actuation of the warm word button, a user interface of the client device 110 can visually render a warm word interface that includes one or more assistant commands associated with the detected warm word activation event. For instance, assume a text message is received at the client device 110. Further assume the warm word activation event engine 151 detects the text message being received at the client device 110, and the warm word button configuration engine 152 configures the warm word button with warm word user interface command, and causes a warm word user interface to be visually rendered at a display of the client device 110 in response to actuation of the warm word button. In this example, the warm word user interface can include, for example, a first selectable graphical element associated with a "reply" assistant command that, when selected (e.g., via a voice selection or touch selection from the user) causes the automated assistant 115 to initiate a reply to the text message received at the client device 110, and a second selectable graphical element associated with a "dismiss" assistant command that, when selected (e.g., via a voice selection or touch selection from the user) causes the automated assistant 115 to dismiss the text message received at the client device 110.

In some implementations, the warm word activation event engine 151 can additionally or alternatively cause can cause one or more currently dormant automated assistant components that utilize the ASR model(s) and/or the NLU model(s) (e.g., the ASR engine 120A1 and/or 120A2, the NLU engine 130A1 and/or 130A2, and/or other automated assistant components) to be activated in response to detecting the occurrence of the warm word activation event and/or an actuation of the warm word button. For example, in response to detecting the warm word activation event is a type of warm word activation event in which the user of the client device 110 can provide one or more spoken utterances (e.g., an incoming electronic communication (e.g., text message, email, social media message, etc.)) to reply to the incoming electronic communication, one or more of the currently dormant automated assistant components that utilize the ASR model(s) and/or the NLU model(s) can be activated. As described in more detail below (e.g., with respect to the user verification engine 160), one or more assistant commands associated with these warm word activation events may require an identity of the user that actuated the warm word button to be verified prior to causing the particular assistant command associated with actuation of the warm word button to be performed such that activation of these one or more currently dormant automated assistant components may be dependent on verification of the identity of the user that actuated the warm word button.

In some implementations, the particular assistant command with which the warm word button is configured may only be performed if the user verification engine 160 determines that an identity of the user actuated the warm word button is verified and that the user is authorized to cause performance of the assistant command. The identity of the user can be verified using various audio-based (e.g., SID or the like) and/or non-audio-based (e.g., facial verification, fingerprint verification, password verification, etc.) techniques. In some versions of those implementations, only a subset of assistant commands may require that the identity of the user is verified and the user is authorized to cause performance of the assistant command, and these subsets of assistant commands may be associated with particular warm word activation events. For example, assistant commands associated with a phone call warm word activation event, text message warm word activation event, and an email warm word activation event may require that the identity of the user that actuated the warm word button is verified using audio-based techniques. However, assistant commands associated with a media warm word activation event may not require that the identity of the user that actuated the warm word button is verified, or require a verification using non-audio-based techniques.

In some versions of those implementations, in performing audio-based verification, the user verification engine 160 can process, using speaker identification (SID) model(s) stored in the ML model(s) database 115A, a stream of audio data that captures voice activity of a user to generate a speaker embedding for the user that provided the spoken utterance. The voice activity can be captured at the same time as actuation of the warm word button or within a threshold duration of time of actuation of the warm word button (e.g., a few seconds before actuation of the warm word button and/or a few seconds after actuation of the warm word button). The generated speaker embedding can be compared, in embedding space, with one or more previously generated speaker embeddings for the user of the client device 110 (e.g., an embedding associated with a user profile of the user). For example, if a distance metric, determined based on the comparing in the embedding space, between the generated speaker embedding and the one or more previously generated speaker embeddings for the user satisfies a threshold, the user can be verified. The one or more previously generated speaker embeddings for the user can be generated based on output(s) generated based on processing of one or more instances of audio data that includes spoken utterances that are from the user (e.g., when initially configuring the client device 110). For example, the one or more previously generated speaker embeddings can be based on an average (or other combination) of a plurality of different embeddings that are each generated based on processing of a corresponding instance of audio data that includes a corresponding spoken utterance from the user of the client device. In some versions of those implementations, the SID model can be a text independent (TI) SID model, whereas in additional or alternative implementations, the SID model can be a text dependent (TD) SID model.

In TD SID, the one or more previously generated speaker embeddings of the user are generated based on spoken utterances that include only one or more particular words or phrases. Moreover, in use, the user must speak the one or more particular words or phrases for one or more TD SID speaker embedding to be generated using the TD SID model, which can be effectively compared to one or more previously generated TD speaker embedding for the user to determine whether the spoken utterance is from an authorized user (e.g., the user of the client device 110 or another user associated with the client device 110). For example, the one or more particular words or phrases in TD speaker recognition can be constrained to one or more invocation phrases configured to invoke the automated assistant (e.g., hot words and/or trigger words such as, for example, "Hey Assistant", "OK Assistant", and/or "Assistant") or one or more other words or phrases. In contrast, in TI SID, the spoken utterance processed using the TI SID model is not constrained to the one or more particular words or phrases. In other words, audio data based on virtually any spoken utterances can be processed using the TI SID model to generate a TI SID speaker embedding, which can be effectively compared to one or more previously generated TI speaker embeddings for the user to determine whether the spoken utterance is from an authorized user (e.g., the user of the client device 110 or another user associated with the client device 110). Moreover, in various implementations, the one or more previously generated TI speaker embeddings of the user utilized in TI SID are generated based on spoken utterances that include disparate words and/or phrases and are not limited to invocation words and/or phrases, and/or any other particular spoken utterances.

In some versions of those implementations, in performing non-audio-based verification, biometric information and/or other information can be utilized to verify the identity of the user that actuated the warm word button. The biometric information utilized to verify the identity of the user can include, for example, facial identification, fingerprint identification, and/or other types of biometric information. For example, vision components of the presence sensors 113 of the client device 110 can capture vision data that includes a face of the user that provided the spoken utterance. The user verification engine 160 can process, using a face identification (FID) model stored in the ML model(s) database 115A, the vision data to generate a facial embedding of the user that actuated the warm word button. The facial embedding of the user that actuated the warm word button can correspond to an embedding that can be compared, in embedding space, to one or more previously generated embeddings corresponding to a facial embedding of the user of the client device 110 to determine whether the user is authorized to cause performance of the assistant command. As another example, a fingerprint sensor of the presence sensors 113 can receive touch input of the user that provided the spoken utterance, and compare the detected fingerprint with a known fingerprint of the user of the client device 110 to determine whether the user is authorized to cause performance of the assistant command. As yet another example, a display interface of the client device 110 can receive touch input of the user corresponding to a password of the client device 110 to verify an identity of the user that actuated the warm word button.

In additional or alternative implementations, the acoustic engine 170 can process the audio data to generate one or more acoustic characteristics associated with the audio data. In these implementations, the automated assistant 115 can additionally or alternatively consider one or more of the acoustic characteristics associated with the audio data in determining whether to cause audio-based verification of the user that actuated the warm word button to be performed. The acoustic engine 170 can utilize various techniques to generate the one or more acoustic characteristics associated with the audio data. For example, the automated assistant 115 can cause audio-based verification to be performed in response to detecting voice activity at the client device 110 to verify an identity of the user that actuated the warm word button.

In some versions of those implementations, the acoustic engine 170 can process, using a voice activity detection (VAD) model stored in the ML model(s) database 115A, the audio data to determine whether any audio data is captured that includes a user speaking at the same time the warm word button is actuated and/or within a threshold duration of time of the warm word button being actuated. In some further versions of these implementations, the ASR engine 120A1 and/or 120A2 and/or the NLU engine 130A1 and/or 130A2 may only be activated in response to determining that voice activity is detected at the client device 110.

In various implementations (e.g., as described with respect to FIG. 4), the automated assistant 115 may additionally or alternatively consider a current state of one or more additional client devices that are in communication with the client device 110 (e.g., over one or more of the networks 199) in causing the warm word button configuration engine 152 to configure the warm word button. The current state of the one or more additional client devices that are in communication with the client device 110 can be determined based on one or more corresponding signals detected at the client device 110. For instance, the current state of the one or more additional client devices that are in communication with the client device 110 can include, for example, an indication that media is being played at one or more of the additional client devices, an indication that an alarm or timer is sounding at one or more of the additional client devices, an indication that a smart networked appliance has a current state (e.g., a smart dishwasher finishing a cleaning cycle, a smart oven reaching a particular temperature, etc.), and/or any other current state of any other additional computing devices. In these implementations, the warm word button can be configured with assistant commands that cause the client device 110 to be controlled and/or that cause one or more of the additional client devices to be controlled.

For example, if an incoming call is received at the client device 110 and a smart speaker is playing music (e.g., detected based on signal(s) generated by microphone(s) of the client device 110 and/or based on signal(s) communicated to the client device 110 from the smart speaker), the warm word button may initially be configured to, when actuated, cause the music to "pause". The warm word button, subsequent to the music being paused, may then be configured to, when actuated again, cause the incoming phone call to be answered (and assuming the user that actuated the warm word button is verified). As another example, if a smart TV in communication with the client device 110 initiates playing of a movie, the warm word button may be configured to, when actuated, cause one or more smart light bulb(s) to be dimmed to a particular level. Although particular examples are described with respect to the various engines of FIG. 1, it should be understood those particular examples are merely for the sake of example and are not meant to be limiting.

Figure 2:
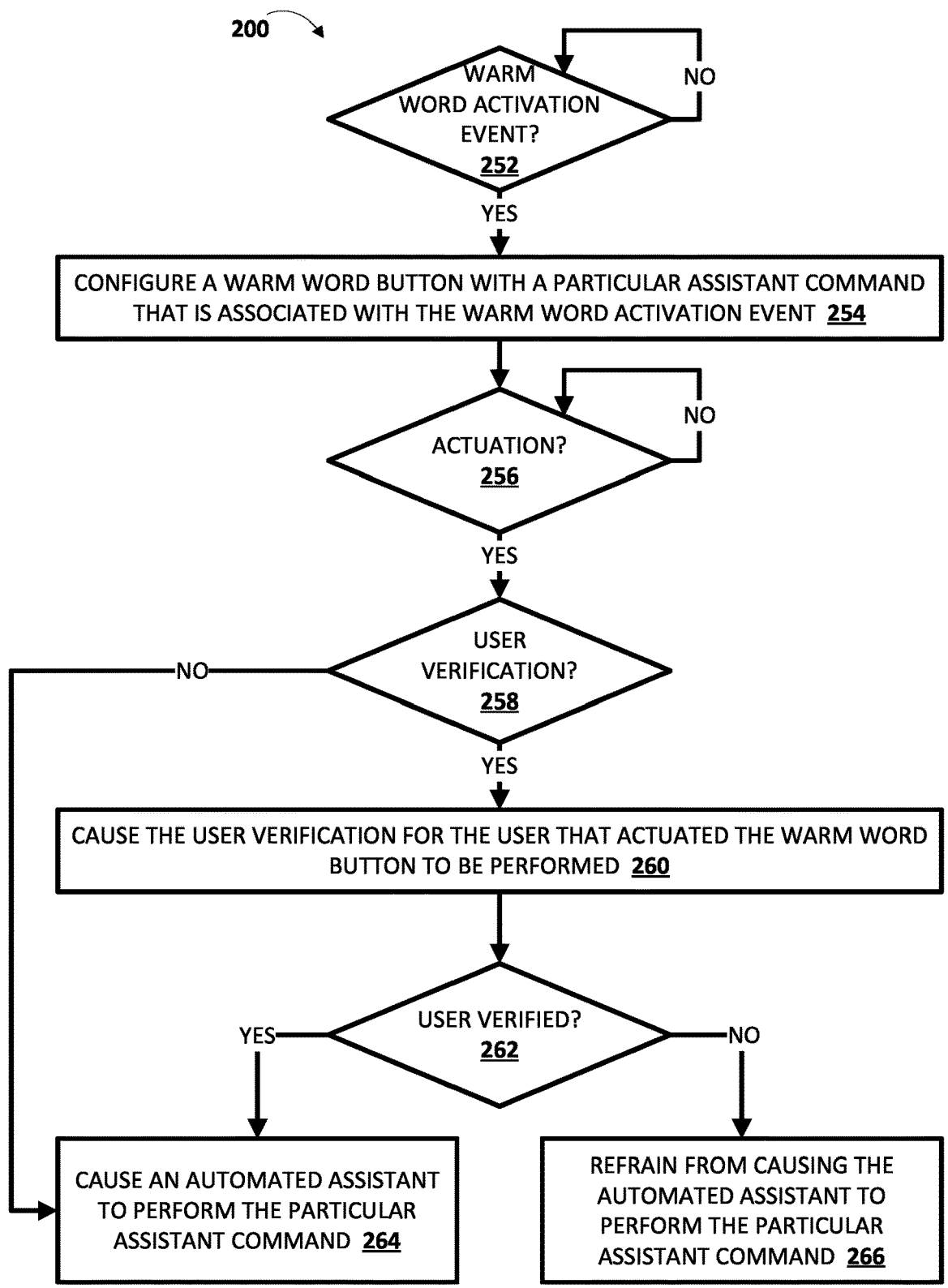
FIG. 2 depicts a flowchart illustrating an example method of configuring a warm word button based on a detected occurrence of a warm word activation event, and determining whether to cause an automated assistant to perform a particular assistant command in response to actuation of the warm word button, in accordance with various implementations.

Turning now to FIG. 2, a flowchart illustrating an example method 200 of configuring a warm word button based on a detected occurrence of a warm word activation event, and determining whether to cause an automated assistant to perform a particular assistant command in response to actuation of the warm word button is depicted. For convenience, the operations of the method 200 are described with reference to a system that performs the operations. This system of the method 200 includes one or more processors, memory, and/or other component(s) of computing device(s) (e.g., client device 110 of FIG. 1, computing device 510 of FIG. 5, one or more servers, and/or other computing devices). Moreover, while operations of the method 200 are shown in a particular order, this is not meant to be limiting. One or more operations may be reordered, omitted, and/or added.

At block 252, the system monitors for an occurrence of a warm word activation event. The warm word activation event can be detected based on one or more signals generated by a client device. Further, the warm word activation event can include, for example, a phone call being received at a client device, a text message being received at a client device, an email being received at a client device, media being played at a client device or an additional client device in an environment of the client device, a notification being received at a client device, a location of a client device, a time at the location of the client device, a software application being accessed at a client device, and/or other events associated with a client device in which the user can provide assistant commands to cause the client device and/or additional client device(s) in communication with the client device be controlled via an automated assistant. Notably, some of these warm word activation events are discrete events (e.g., a phone call being received at the client device, a text message being received at a client device, an email being received at a client device, an alarm or timer sounding at a client device, etc.), whereas some other of these warm word activation events are continuous events (e.g., a software application being accessed at a client device). Moreover, it should be noted that these warm word activation events are not mutually exclusive. Put another way, the system can detect multiple warm word activation events at a given instance of time. If, at an iteration of block 252, the system does not detect an occurrence of a warm word activation event, the system can continue monitoring for an occurrence of a warm word activation event at block 252. If, at an iteration of block 252, the system detects an occurrence of a warm word activation event, the system can proceed to block 254.

At block 254, the system configures a warm word button with a particular assistant command that is associated with the warm word activation event. The warm word button can be, for example, a hardware button of the client device, an agnostic software button of the client device, and/or an external button (e.g., an external hardware button or external software button) that is associated with the client device. In some implementations, the system can configure the warm word button with a default assistant command associated with the warm word activation event as the particular assistant command. In additional or alternative implementations, the system can configure the warm word button with a particular assistant command that is specified by the user prior to detecting the occurrence of the warm word activation event (e.g., via settings of an automated assistant application).

At block 256, the system determines whether a user has actuated the warm word button. If, at an iteration of block 256, the system determines that a user has not actuated the warm word button, the system can continue monitoring for actuation of the warm word button until one or more conditions are satisfied (e.g., whether the warm word button is actuated within a threshold duration of time of detecting the warm word activation event and/or configuring the warm word button with the particular assistant command). If, at an iteration of block 256, the system determines that a user has actuated the warm word button, the system can proceed to block 258.

At block 258, the system determines whether user verification is required for the user that actuated the warm word button. The system can determine whether user verification is required for the user that actuated the warm word button based on a type of the warm word activation event detected at block 252. The types of warm word activation events can be based on, for example, an intent or group of intents associated with the particular assistant command with which the warm word button is configured. For example, if the warm word activation event is associated with an incoming electronic communication (e.g., an incoming text message, email, social media message, etc.), otherwise communicating with another user (e.g., an incoming phone call), a software application being accessed at the client device, or a notification being received at the client device, then the system may determine that user verification is required for the user that actuated the warm word button. However, if the warm word activation event is associated with media being played, or a timer or alarm sounding, then the system may determine that user verification is not required. If, at an iteration of block 258, the system determines that user verification is not required for the user that actuated the warm word button, the system can proceed to block 264. Block 264 is described in more detail below. If, at an iteration of block 258, the system determines that user verification is required for the user that actuated the warm word button, the system can proceed to block 260.

Figure 3:
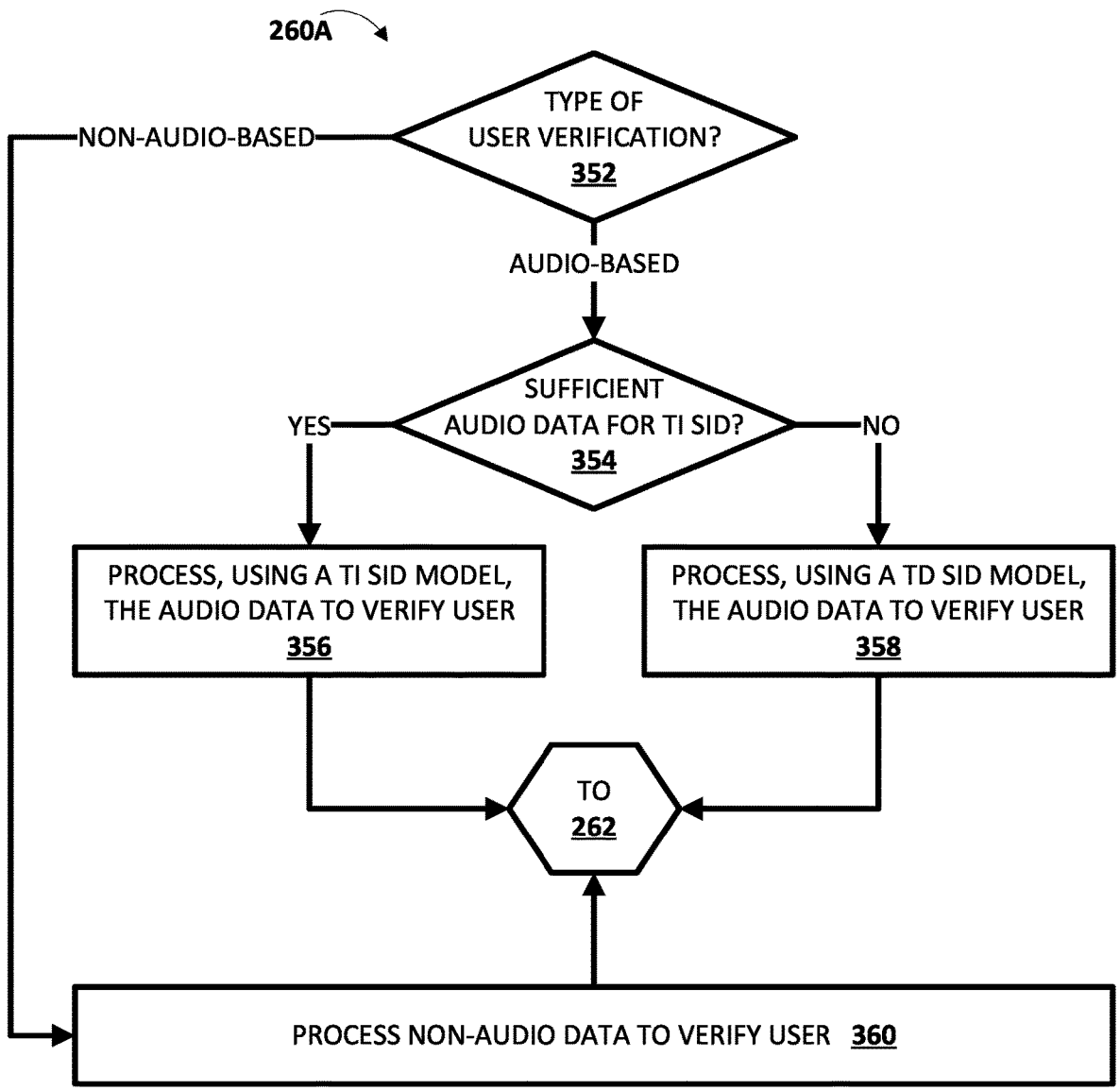
FIG. 3 depicts a flowchart illustrating an example method of causing user verification of a user that actuated the warm word button in the example method of FIG. 2 to be performed, in accordance with various implementations.

At block 260, the system causes the user verification for the user that actuated the warm word button to be performed. For example, and referring briefly to FIG. 3, an example method 260A of causing user verification of a user that actuated the warm word button in the example method of FIG. 2 to be performed is depicted. At block 352, the system determines a type of user verification to be performed. The type of user verification to be performed can include, for example, audio-based user verification and/or non-audio-based user verification. The system can determine whether to perform audio-based user verification or non-audio-based user verification based on, for example, an intent or group of intents associated with the particular assistant command with which the warm word button is configured being mapped to audio-based user verification or non-audio-based user verification, voice activity detected at the client device indicating audio-based user verification should be performed, and/or other considerations. If, at an iteration of block 352, the system determines to perform non-audio-based verification, the system can proceed to block 360. Block 360 is described in more detail below. If, at an iteration of block 352, the system determines to perform audio-based verification, the system can proceed to block 354.

At block 354, the system determines whether audio data included in a stream of audio data generated by microphone (s) of the client device is sufficient to perform TI SID. The system can determine whether the audio data included in the stream of audio data is sufficient to perform TI SID by comparing a length of a spoken utterance, if any, captured in the audio data to a threshold length. The system can determine the audio data is sufficient to perform TI SID if the spoken utterance satisfies the threshold length. If, at an iteration of block 354, the system determines the audio data is sufficient to perform TI SID, then the system can proceed to block 356. At block 356, the system processes, using a TI SID model, the audio data to generate a TI SID embedding in verifying an identity of the user that actuated the warm word button. Further, the system compares, in a TI SID embedding space, the generated TI SID embedding to one or more previously generated TI SID speaker embeddings for one or more users of the client device. Moreover, the system can determine, based on a distance metric determined based on the comparing, whether the TI SID speaker embedding corresponds to one or more of the previously generated TI SID speaker embeddings. If the system determines that the generated TI SID embedding sufficiently corresponds to one or more of the previously generated TI SID speaker embeddings, the system may determine that the user is verified. Otherwise, the system may determine that the user is not verified.

If, at an iteration of block 354, the system determines the audio data is not sufficient to perform TI SID, then the system can proceed to block 358. At block 358, the system processes, using a TD SID model, the audio data to generate a TD SID speaker embedding in verifying an identity of the user that actuated the warm word button. Further, the system compares, in a TD SID embedding space, the TD SID speaker embedding for the user to one or more previously generated TI SID speaker embeddings for one or more users of the client device. Notably, the TD SID speaker embedding corresponds to a speaker embedding for one or more particular words and/or phrases. Moreover, the system can determine, based on a distance metric determined based on the comparing, whether the TD speaker embedding corresponds to one or more of the previously generated TD speaker embeddings for one or more of the particular words and/or phrases. If the system determines the distance metric satisfies a distance threshold, the system may determine that the user is verified. Otherwise, the system may determine that the user is not verified.

Notably, in various implementations, the system can prompt the user that actuated the warm word button to provide one or more spoken utterances to be utilized in TI SID and/or TD SID. For example, assume the warm word activation event detected at block 252 corresponds to an incoming text message, and the warm word button is configured with a "reply" assistant command at block 254 that, when actuated, enables the user to begin dictating a reply text message. In this example, and assuming the user has not already begun dictating the reply message, the system can prompt the user to say a particular word or phrase to be utilized in TD SID to verify the identity of the user (e.g., "Assistant", the user's name, or another particular word or phrase). In additional or alternative implementations, and assuming that the user has begun dictating the reply message in the above example, the system can utilize spoken utterances captured in a stream of audio data to perform TI SID and/or TD SID to verify the identity of the user without prompting the user to provide any spoken utterances. Also, in various implementations, the system may perform both TI SID and TD SID in verifying the identity of the user that actuated the warm word button. The system may proceed to block 262. Block 262 is described in more detail below.

At block 360, the system processes non-audio data in verifying the identity of the user that actuated the warm word button. For example, the system can process vision data generated by vision component(s) of the client device or an additional client device in communication with the client device to generate a facial embedding of the user using an FID model, and can compare the facial embedding to one or more previously generated facial embeddings of the user of the client device to verify the identity of the user. As another example, the system can process data generated by a fingerprint sensor of the client device, and compare the fingerprint data of a known user of the client device to verify the identity of the user. As another example, touch input capturing a password of the client device can be compared to a known password of the client device to verify the identity of the user. In some implementations, the system can prompt the user to provide the non-audio-based data to verify the identity of the user.

In additional or alternative implementations, the system can consider whether an identity of a user had been verified within a threshold duration of time of detecting the actuation of the warm word button (e.g., before configuring the warm word button and/or subsequent to configuring the warm word button). For example, assume the warm word activation event detected at block 252 corresponds to an incoming text message, and the warm word button is configured with a "reply" assistant command at block 254 that, when actuated, enables the user to begin dictating a reply text message. Further assume that, two seconds prior to detecting the actuation of the warm word button, the user had provided a password to unlock the client device. In this example, the system may utilize the password verification as a signal that is sufficient to verify the identity of the user that actuated the warm word button without performing any additional audio-based verification and/or non-audio-based verification regardless of any intents or groups of intents being mapped to the assistant command with which the warm word button is configured.

Referring back to FIG. 2, at block 262, the system can determine whether an identity of the user that actuated the button has been verified based on processing signals generated at block 356, block 358, and/or block 360. If, at an iteration of block 262, the system determines that the identity of the user that actuated the warm word button is verified, then the system can proceed to block 264. At block 264, the system causes an automated assistant to perform the particular assistant command. Continuing with the above example where the warm word activation event detected at block 252 corresponds to the incoming text message, the system can cause any subsequent speech to be processed using various automated assistant components (e.g., the ASR engine 120A1 and/or 120A2, the NLU engine 130A1 and/or 130A2) to compose the reply message on behalf of the user that actuated the warm word button. If, at an iteration of block 262, the system determines that the identity of the user that actuated the warm word button is not verified, then the system can proceed to block 266. At block 266, the system refrains from causing the automated assistant to perform the particular assistant command. Continuing with the above example where the warm word activation event detected at block 252 corresponds to the incoming text message, the system can refrain from causing any subsequent speech to be processed using these various automated assistant components. The system can return to block 252 to continue monitoring for occurrences of warm word activation events. Although particular examples are described with respect to FIGS. 2 and 3, it should be understood those particular examples are merely for the sake of example and are not meant to be limiting.

Figure 4:
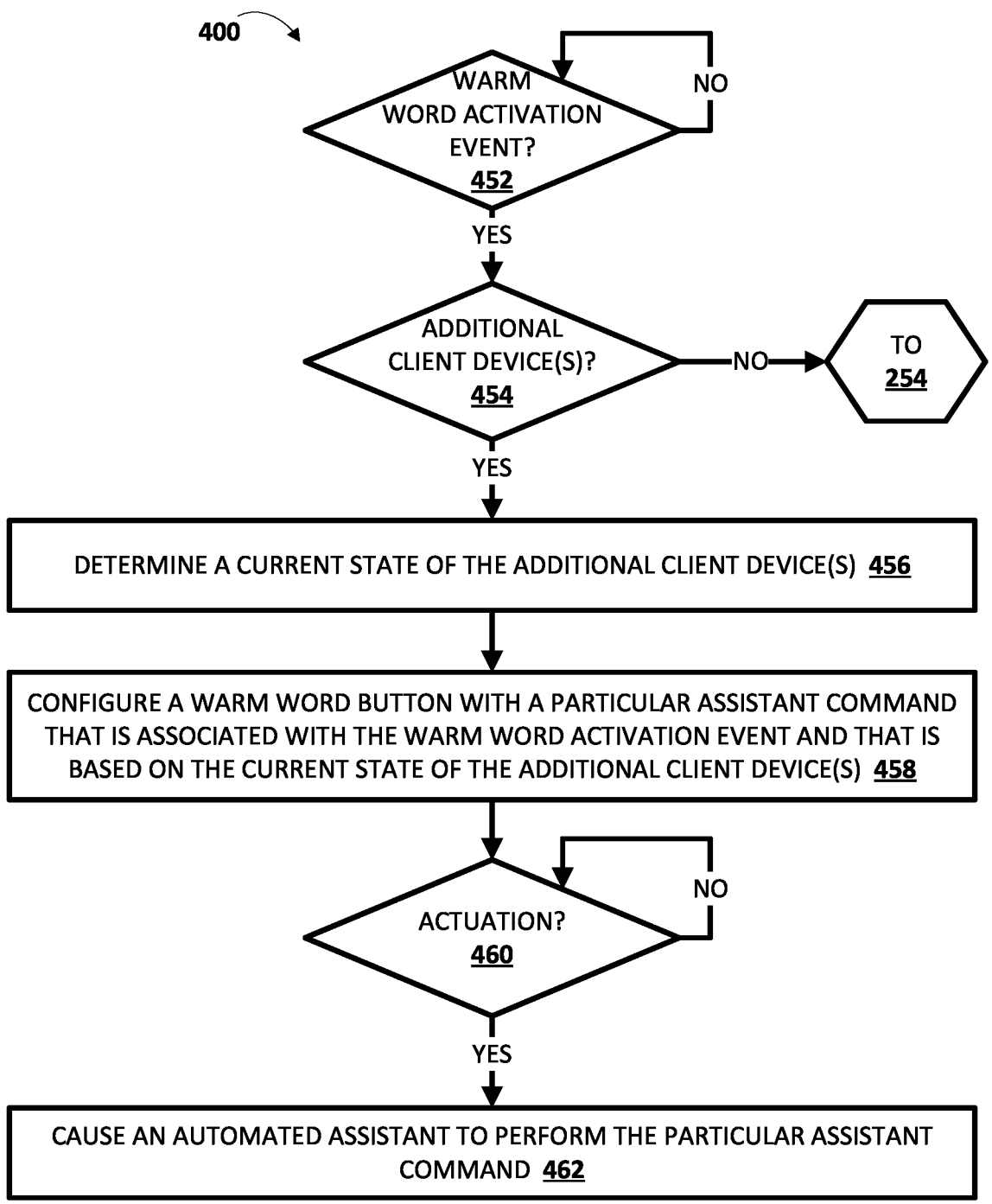
FIG. 4 depicts a flowchart illustrating an example method of configuring a warm word button based on a detected occurrence of a warm word activation event and based on a current state of client device(s) in an environment of a user, in accordance with various implementations.

Turning now to FIG. 4, an example method 400 of configuring a warm word button based on a detected occurrence of a warm word activation event and based on a current state of client device(s) in an environment of a user is depicted. For convenience, the operations of the method 400 are described with reference to a system that performs the operations. This system of the method 400 includes one or more processors, memory, and/or other component(s) of computing device(s) (e.g., client device 110 of FIG. 1, computing device 510 of FIG. 5, one or more servers, and/or other computing devices). Moreover, while operations of the method 400 are shown in a particular order, this is not meant to be limiting. One or more operations may be reordered, omitted, and/or added.

At block 452, the system monitors for an occurrence of a warm word activation event. The system can monitor for the occurrence of the warm word activation event in the same or similar manner described with respect to block 252 of FIG. 2. If, at an iteration of block 452, the system does not detect an occurrence of a warm word activation event, the system can continue monitoring for an occurrence of a warm word activation event at block 452. If, at an iteration of block 452, the system detects an occurrence of a warm word activation event, the system can proceed to block 454.

At block 454, the system can determine whether there is any additional client device in an environment of a client device at which the warm word activation event was detected. The system can determine whether there is any additional client devices in the environment of the client device at which the warm word activation event was detected based on, for example, one or more signals generated by one or more additional client devices and transmitted to the client device that indicate they are co-located in the environment, audible output being rendered by one or more additional client devices that is detected by microphone(s) of the client device, and/or using any other techniques. For instance, the client device may maintain a list of one or more additional client devices that are co-located in the environment. If, at an iteration of block 454, the system determines that no additional client device is co-located in the environment, then the system may proceed to block 254 of FIG. 2, and proceed with operations of the method 200 as described above. If, at an iteration of block 454, the system determines that one or more additional client devices are co-located in the environment, then the system may proceed to block 456.

At block 456, the system determines a current state of the one or more additional client devices that are co-located in the environment. The current state of the one or more additional client devices that are co-located in the environment can include, for example, an indication of audible and/or visual content being rendered at smart speaker(s) and/or smart TV(s), an volume of content being audibly rendered at smart speaker(s) and/or smart TV(s), a brightness of smart light bulb(s), an indication of a timer or alarm sounding at one or more of the additional client devices, an indication of a temperature of a smart oven, and/or any other current state of any other client device that is co-located in the environment of the client device. Notably, the current state may be triggered based on a warm word activation event at one or more of the additional client devices (e.g., the example of the timer or alarm sounding at one or more of the additional client devices).

At block 458, the system configures a warm word button with a particular assistant command that is associated with the warm word activation event and that is based on the current state of one or more of the additional client devices. The warm word button can be associated with a client device and can be, for example, a hardware button of the client device, an agnostic software button of the client device, and/or an external button (e.g., an external hardware button or external software button) that is associated with the client device. Nonetheless, the warm word button that is associated with the client device can be configured with particular assistant commands associated with controlling one or more of the additional client devices. Put another way, the system can consider the current state of multiple client devices when the warm word activation event is detected in configuring the warm word button.

In some implementations, the system can configure the warm word button that is associated with the client device based on warm word activation events detected at the client device and based on the current state of one or more of the additional client devices. For example, assume the warm word activation event corresponds to a phone call being received at the client device. Further assume that a music is being played at a smart speaker co-located in an environment of the client device. In this example, the warm word button that is associated with the client device may be configured with an assistant command that, when actuated, causes the music being played at the smart speaker to be paused based on the current state of the smart speaker indicating that music is being played even though the assistant command that causes the music being played at the smart speaker to be paused is not directly related to the warm word activation event detected at the client device (e.g., the incoming phone call). Nonetheless, by configuring the warm word button to pause the music in this example, the user can quickly and efficiently cause the music to be paused such that, when the user subsequently causes the incoming phone call to be answered, the user does not have to speak over the music during the phone call.

In additional or alternative implementations, the system can configure the warm word button that is associated with the client device based on warm word activation events detected at one or more of the additional client devices and based on the current state of one or more of the additional client devices. For example, assume the warm word activation event corresponds to a movie being initiated at a smart TV that is co-located in an environment of the client device. In this example, the warm word button that is associated with the client device may be configured with an assistant command that, when actuated, causes smart light bulb(s) that are also co-located in the environment of the client device to be dimmed. Similar to the above example, the warm word button can be configured to control other devices even though the warm word activation event is based on signals generated by an additional client device (e.g., the smart TV) and the assistant command with which the warm word button that is associated with the client device is configured does not control the client device (e.g., controlling the smart light bulb(s) instead). Nonetheless, by configuring the warm word button to dim the smart light bulb(s) in this example, the user can quickly and efficiently cause the cause the smart light bulb(s) to be dimmed via reduced user input (e.g., a single tap of the warm word button rather than manually dimming the lights via a software application associated with the smart light bulb(s)). As another example, assume the warm word activation event corresponds to a timer or alarm sounding at a standalone client device that is co-located in an environment of the client device. In this example, the warm word button that is associated with the client device may be configured with an assistant command that, when actuated, causes the timer or alarm to be silenced even though the timer or alarm is not sounding at the client device with which the warm word button is associated. Similar to the above example, the warm word button can be configured to control other devices even though the warm word activation event is based on signals generated by an additional client device (e.g., the standalone device) and the assistant command with which the warm word button that is associated with the client device is configured does not control the client device controlling the standalone device instead.

At block 460, the system determines whether a user has actuated the warm word button. If, at an iteration of block 460, the system determines that a user has not actuated the warm word button, the system can continue monitoring for actuation of the warm word button until one or more conditions are satisfied (e.g., whether the warm word button is actuated within a threshold duration of time of detecting the warm word activation event and/or configuring the warm word button with the particular assistant command). If, at an iteration of block 460, the system determines that a user has actuated the warm word button, the system can proceed to block 462. At block 462, the system causes an automated assistant to perform the particular assistant command. The system can return to block 452 to continue monitoring for occurrences of warm word activation events.

In various implementations, in returning to block 452 to continue monitoring for occurrences of warm word activation events, the system may still detect an occurrence of the warm word activation event that was previously acted upon. For instance, and from the above examples, the system may still detect the incoming phone call at the client device after the warm word button was actuated to pause the music at the smart speaker, or the movie being initiated at the smart TV after the warm word button was actuated to dim the lights. In these examples, the system may perform another iteration of the method 400 of FIG. 4 to reconfigure the warm word button with a successive assistant command that is associated with the warm word activation event. For instance, in the above example where the warm word activation event corresponds to the incoming phone call, assume the user actuated the button to pause the music being played by the smart speaker. In this example, and in a subsequent iteration of the method 400 of FIG. 4, the system can cause the warm word button to be reconfigured with an assistant command that, when actuated, causes an automated assistant to answer the incoming phone call. Notably, in this subsequent iteration of the method 400 of FIG. 4, the current state of the smart speaker will indicate that the music that was playing at the smart speaker has already been paused, so the system may not consider reconfiguring the warm word button with the same assistant command that was previously acted upon. Also, for instance, in the above example where the warm word activation event corresponds to the movie being initiated at the smart TV, assume the user actuated the button to dim the smart light bulb(s). In this example, and in a subsequent iteration of the method 400 of FIG. 4, the system can cause the warm word button to be reconfigured with an assistant command that, when actuated, causes the client device to be placed in a "do not disturb mode" or a "silent" mode. Similarly, in this subsequent iteration of the method 400 of FIG. 4, the current state of the smart light bulb(s) will indicate that the smart light bulb(s) have already been dimmed, so the system may not consider reconfiguring the warm word button with the same assistant command that was previously acted upon.

Although the example method 400 of FIG. 4 is described herein without any user verification (e.g., as described with respect to the method 200 of FIG. 2 and the method 260A of FIG. 3), it should be understood that is for the sake of brevity and is not meant to be limiting. For example, in implementations where the particular assistant command utilized in configuring the warm word button is associated with an intent or group of intents that require user verification, then the user verification can be performed in the same or similar manner as described with respect to FIGS. 2 and 3. Moreover, although particular examples are described with respect to FIG. 4, it should be understood those particular examples are merely for the sake of example and are not meant to be limiting.

Figure 5:
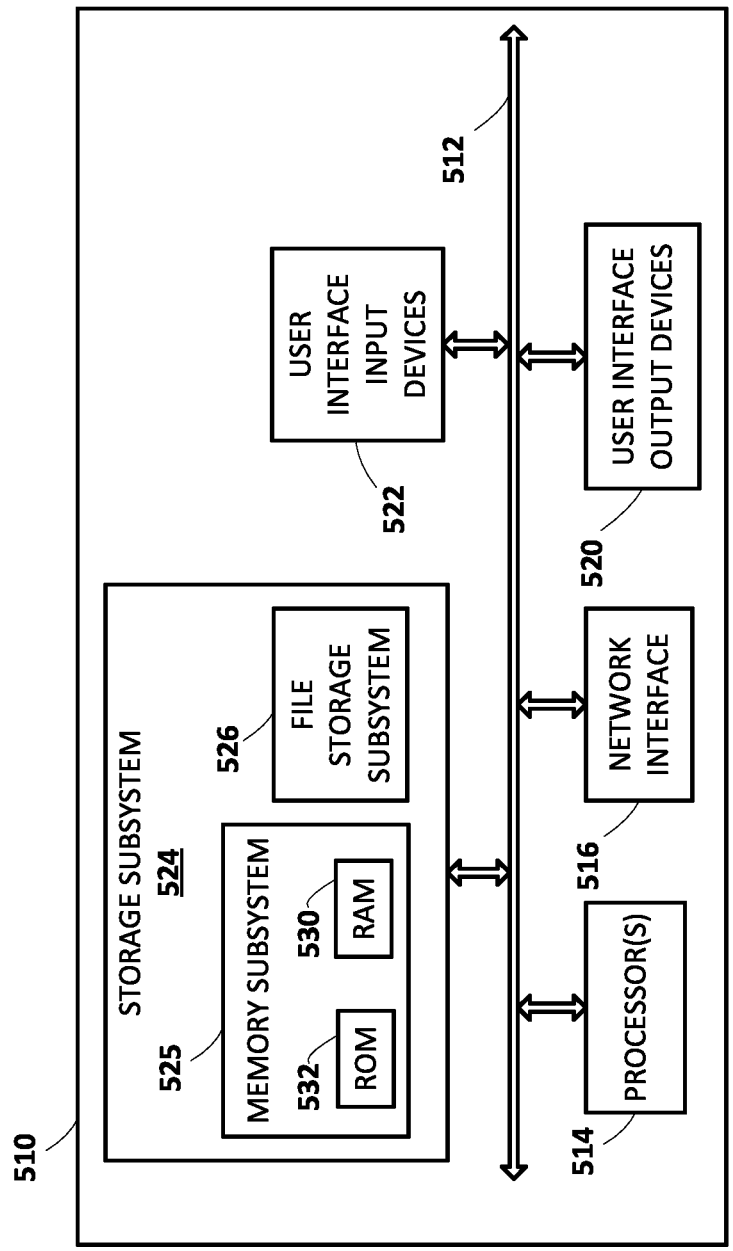
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes detecting, based on processing one or more signals generated by a client device, an occurrence of a warm word activation event. The warm word activation event is one of multiple disparate warm word activation events. The method further includes, in response to detecting the occurrence of the warm word activation event: configuring a warm word button, that is associated with the client device, with a particular assistant command that is associated with the warm word activation event; detecting an actuation of the warm word button; and in response to detecting the actuation of the warm word button: determining whether user verification is required for a user that actuated the warm word button. The method further includes in response to determining that the user verification is required for the user that actuated the warm word button: causing the user verification for the user that actuated the warm word button to be performed; and in response to determining that the user that actuated the warm word button has been verified: causing an automated assistant to perform the particular assistant command associated with the warm word activation event.

These and other implementations of technology disclosed herein can optionally include one or more of the following features.

In some implementations, the warm word activation event may include one or more of: a phone call being received at the client device, a text message being received at the client device, an email being received at the client device, media being played at the client device or an additional client device in an environment of the client device, a notification being received at the client device, a location of the client device, a time at the location of the client device, a network connection between the client device and an additional computing device that is in addition to the client device, or a software application being accessed at the client device.

In some implementations, configuring the warm word button of the client device with the particular assistant command associated with the warm word activation event may include configuring the warm word button with the particular assistant command for a threshold duration of time. In some versions of those implementations, the threshold duration of time may be based on a type of the warm word activation event. In additional or alternative versions of those implementations, the method may further include in response to detecting no actuation of the warm word button within the threshold duration of time: reconfiguring the warm word button with a default functionality.

In some implementations, determining whether the user verification is required for the user that actuated the warm word button may be based on a duration of time since a given user was last verified at the client device. In some versions of those implementations, determining whether the user verification is required for the user that actuated the warm word button may be further based on a proximity of the given user to the client device during the duration of time since the given user was last verified at the client device.

In some implementations, determining whether the user verification is required for the user that actuated the warm word button may be based on a type of the warm word activation event.

In some implementations, causing the user verification for the user that actuated the warm word button to be performed may include determining whether to perform audio-based verification or non-audio-based verification.

In some versions of those implementations, the method may further include determining to perform the audio-based verification based on voice activity of the user being detected at the same time as the actuation of the warm word button or within a threshold duration of time of actuation of the warm word button. In some further versions of those implementations, the method may further include, in response to determining to perform the audio-based verification: processing, using a speaker identification (SID) model, audio data that captures the voice activity to determine whether the audio data is sufficient to verify the user that actuated the warm word button. In yet further versions of those implementations, processing, using the SID model, the audio data that captures the voice activity to determine whether the audio data is sufficient to verify the user that actuated the warm word button may include processing, using a text dependent (TD) SID model as the SID model, the audio data to generate a TD speaker embedding. Determining whether the audio data is sufficient to verify the user that actuated the warm word button may include comparing, in an embedding space, the TD speaker embedding to one or more stored TD speaker embeddings stored locally at the client device; and determining, based on comparing the TD speaker embedding to the one or more stored TD speaker embeddings, whether the audio data is sufficient to verify the user that actuated the warm word button. In additional or alternative yet further versions of those implementations, processing, using the SID model, the audio data that captures the voice activity to determine whether the audio data is sufficient to verify the user that actuated the warm word button may include, in response to determining that the spoken utterance is a sufficient length to perform text independent (TI) SID: processing, using a TI SID model as the SID model, the audio data to generate a TI speaker embedding. Determining whether the audio data is sufficient to verify the user that actuated the warm word button may include comparing, in an embedding space, the TI speaker embedding to one or more stored TI speaker embeddings stored locally at the client device; and determining, based on comparing the TI speaker embedding to the one or more stored TI speaker embeddings, whether the audio data is sufficient to verify the user that actuated the warm word button.

In some versions of those implementations, the method may further include determining to perform the audio-based verification based on a type of the warm word activation event.

In some versions of those implementations, the non-audio-based verification may include one or more of: facial verification, fingerprint verification, or password verification.

In some implementations, the method may further include, in response to determining that the user that actuated the warm word button has not been verified: refraining from causing the automated assistant to perform the particular assistant command associated with the warm word activation event.

In some implementations, the method may further include, in response to determining that the user verification is not required for the user that actuated the warm word button: causing the automated assistant to perform the particular assistant command associated with the warm word activation event.

In some implementations, the warm word button may be a hardware button of the client device.

In some implementations, the warm word button may be an agnostic software button rendered at a display of the client device.

In some implementations, the warm word button may be an external hardware button that is separate from the client device.

In some implementations, the particular assistant command may be one of multiple disparate assistant commands associated with the warm word activation event.

In some implementations, a system is provided, and includes a warm word button; at least one processor; and memory storing instructions that, when executed, cause the at least one processor to: detect, based on processing one or more signals generated by a client device, an occurrence of a warm word activation event; in response to detecting the occurrence of the warm word activation event: configure a warm word button, that is associated with the client device, with a particular assistant command that is associated with the warm word activation event, wherein the particular assistant command is one of multiple disparate associated commands associated with the warm word activation event; detect an actuation of the warm word button; and in response to detecting the actuation of the warm word button: determine whether user verification is required for a user that actuated the warm word button; in response to determining that the user verification is required for the user that actuated the warm word button: cause the user verification for the user that actuated the warm word button to be performed; and in response to determining that the user that actuated the warm word button has been verified: cause an automated assistant to perform the particular assistant command associated with the warm word activation event. The warm word activation event is one of multiple disparate warm word activation events.

In some implementations, a method implemented by one or more processors is provided, and includes detecting, based on processing one or more signals generated by a client device, an occurrence of a warm word activation event. The warm word activation event is one of multiple disparate warm word activation events. The method further includes, in response to detecting the occurrence of the warm word activation event: determining a current state of an at least one additional client device, the at least one additional client device being in addition to the client device, and the at least one additional client device being in communication with the client device over one or more networks; configuring a warm word button with a particular assistant command that is associated with the warm word activation event and that is based on the current state of the at least one additional client device; detecting an actuation of the warm word button; and in response to detecting the actuation of the warm word button: causing an automated assistant to perform the particular assistant command associated with the warm word activation event.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors of a client device, the method comprising:

detecting, based on processing one or more signals generated by the client device, an occurrence of a warm word activation event, wherein the warm word activation event is one of multiple disparate warm word activation events, wherein the warm word activation event corresponds to an incoming electronic communication that is received at the client device, and wherein the incoming electronic communication that is received at the client device is one of: a text message that is received at the client device, an email that is received at the client device, or a notification that is received at the client device;

in response to detecting the occurrence of the incoming electronic communication that is received at the client device:

determining whether the incoming electronic communication that is received at the client device is the text message, the email, or the notification;

determining, based on whether the incoming electronic communication that is received at the client device is the text message, the email, or the notification, a threshold duration of time to configure a warm word button, that is associated with the client device, with a particular assistant command that, when actuated, initiates a reply electronic communication that is a reply to the incoming electronic communication that is received at the client device, wherein the threshold duration of time differs based on whether the incoming electronic communication that is received at the client device is the text message, the email, or the notification; and configuring, for the threshold duration of time, the warm word button with the particular assistant command that, when actuated, initiates the reply electronic communication that is the reply to the incoming electronic communication that is received at the client device;

determining whether an actuation of the warm word button is detected during the occurrence of the warm word activation event or within the threshold duration of time;

in response to detecting the actuation of the warm word button during the occurrence of the warm word activation event or within the threshold duration of time:

determining whether user verification is required for a user that actuated the warm word button;

determining, based on the warm word activation event corresponding to the incoming electronic communication being received at the client device, that the user verification is required for the user that actuated the warm word button;

causing the user verification for the user that actuated the warm word button to be performed;

in response to determining that the user that actuated the warm word button has been verified:
causing an automated assistant to initiate the reply electronic communication that is the reply to the incoming electronic communication that is received at the client device; and in response to determining that the user that actuated the warm word button has not been verified:
refraining from causing an automated assistant to initiate the reply electronic communication that is the reply to the incoming electronic communication that is received at the client device; and in response to detecting no actuation of the warm word button during the occurrence of the warm word activation event or within the threshold duration of time:
reconfiguring the warm word button with a default functionality.

2. The method of claim 1, determining whether the user verification is required for the user that actuated the warm word button is further based on a duration of time since a given user was last verified at the client device.

3. The method of claim 2, wherein determining whether the user verification is required for the user that actuated the warm word button is further based on a proximity of the given user to the client device during the duration of time since the given user was last verified at the client device.

4. The method of claim 1, wherein causing the user verification for the user that actuated the warm word button to be performed comprises:
determining whether to perform audio-based verification or non-audio-based verification.

5. The method of claim 4, further comprising:
determining to perform the audio-based verification based on voice activity of the user being detected at the same time as the actuation of the warm word button or within a threshold duration of time of actuation of the warm word button.

6. The method of claim 5, further comprising:
in response to determining to perform the audio-based verification:
processing, using a speaker identification (SID) model, audio data that captures the voice activity to determine whether the audio data is sufficient to verify the user that actuated the warm word button.

7. The method of claim 6, wherein processing, using the SID model, the audio data that captures the voice activity to determine whether the audio data is sufficient to verify the user that actuated the warm word button comprises:
processing, using a text dependent (TD) SID model as the SID model, the audio data to generate a TD speaker embedding, and
wherein determining whether the audio data is sufficient to verify the user that actuated the warm word button comprises:
comparing, in an embedding space, the TD speaker embedding to one or more stored TD speaker embeddings stored locally at the client device; and
determining, based on comparing the TD speaker embedding to the one or more stored TD speaker embeddings, whether the audio data is sufficient to verify the user that actuated the warm word button.

8. The method of claim 6, wherein processing, using the SID model, the audio data that captures the voice activity to determine whether the audio data is sufficient to verify the user that actuated the warm word button comprises:
in response to determining that the spoken utterance is a sufficient length to perform text independent (TI) SID:
processing, using a TI SID model as the SID model, the audio data to generate a TI speaker embedding, and
wherein determining whether the audio data is sufficient to verify the user that actuated the warm word button comprises:
comparing, in an embedding space, the TI speaker embedding to one or more stored TI speaker embeddings stored locally at the client device; and
determining, based on comparing the TI speaker embedding to the one or more stored TI speaker embeddings, whether the audio data is sufficient to verify the user that actuated the warm word button.

9. The method of claim 4, further comprising:
determining to perform the audio-based verification based on whether the incoming electronic communication that is received at the client device is the text message, the email, or the notification.

10. The method of claim 4, wherein the non-audio-based verification comprises one or more of: facial verification, fingerprint verification, or password verification.

11. The method of claim 1, wherein the warm word button is one of: a hardware button of the client device, an agnostic software button rendered at a display of the client device, or an external hardware button that is separate from the client device.

12. The method of claim 1, wherein the incoming electronic communication that is received at the client device is the text message or the email.

13. A client device comprising:
a warm word button;
at least one processor; and
memory storing instructions that, when executed, cause the at least one processor to:
detect, based on processing one or more signals generated by the client device, an occurrence of a warm word activation event, wherein the warm word activation event is one of multiple disparate warm word activation events, wherein the warm word activation event corresponds to an incoming electronic communication that is received at the client device, and wherein the incoming electronic communication that is received at the client device is one of: a text message that is received at the client device, an email that is received at the client device, or a notification that is received at the client device;

in response to detecting the occurrence of the incoming electronic communication that is received at the client device:
determine whether the incoming electronic communication that is received at the client device is the text message, the email, or the notification;
determine, based on whether the incoming electronic communication that is received at the client device is the text message, the email, or the notification, a threshold duration of time to configure a warm word button, that is associated with the client device, with a particular assistant command that, when actuated, initiates a reply electronic communication that is a reply to the incoming electronic communication that is received at the client device, wherein the threshold duration of time differs based on whether the incoming electronic communication that is received at the client device is the text message, the email, or the notification; and configure, for the threshold duration of time, the warm word button with the particular assistant command that, when actuated, initiates the reply electronic communication that is the reply to the incoming electronic communication that is received at the client device;

determine whether an actuation of the warm word button is detected during the occurrence of the warm word activation event or within the threshold duration of time;

in response to detecting the actuation of the warm word button during the occurrence of the warm word activation event or within the threshold duration of time:

determine whether user verification is required for a user that actuated the warm word button;

determine, based on the warm word activation event corresponding to the incoming electronic communication being received at the client device, that the user verification is required for the user that actuated the warm word button;

cause the user verification for the user that actuated the warm word button to be performed;

in response to determining that the user that actuated the warm word button has been verified:

cause an automated assistant to initiate the reply electronic communication that is the reply to the incoming electronic communication that is received at the client device; and in response to determining that the user that actuated the warm word button has not been verified:

refrain from causing an automated assistant to initiate the reply electronic communication that is the reply to the incoming electronic communication that is received at the client device; and in response to detecting no actuation of the warm word button during the occurrence of the warm word activation event or within the threshold duration of time:

reconfigure the warm word button with a default functionality.

14. A method implemented by one or more processors of a client device, the method comprising:

detecting, based on processing one or more signals generated by the client device, an occurrence of a warm word activation event, wherein the warm word activation event is one of multiple disparate warm word activation events, wherein the client device is co-located in an ecosystem of devices that includes at least the client device and an additional client device that is in addition to the client device, wherein the additional client device is in communication with the client device over one or more local area networks, wherein the device and the additional device are co-located within the same physical environment, and wherein the warm word activation event corresponds to audible output being rendered, in the ecosystem of devices, via the additional client device;

in response to detecting the occurrence of the warm word activation event:

determining a current state of the additional client device, the current state of the additional client device being determined based on audio data, generated by one or more microphones of the client device, that captures the audible output being rendered via one or more speakers of the additional client device; and configuring a warm word button, of the client device, with a particular assistant command that is associated with the audible output being rendered via the additional client device that is based on the current state of the additional client device, wherein the particular assistant command, when performed, causes the audible output being rendered, in the ecosystem of devices, via the additional client device to be silenced;

detecting an actuation of the warm word button of the client device; and in response to detecting the actuation of the warm word button of the client device:

causing an automated assistant to perform the particular assistant command associated with the audible output being rendered via the additional client device, wherein causing the automated assistant to perform the particular assistant command comprises causing the automated assistant to silence the audible output being rendered, in the ecosystem of devices, via the additional client device.

* * * * *